(12) United States Patent
Derjong

(10) Patent No.: US 10,073,471 B2
(45) Date of Patent: Sep. 11, 2018

(54) PNEUMATIC CONTROL AND MEASURING DEVICE AS WELL AS SEAT COMFORT SYSTEM

(71) Applicant: Kendrion Kuhnke Automotive GmbH, Malente (DE)

(72) Inventor: Jan Derjong, Kiel (DE)

(73) Assignee: Kendrion Kuhnke Automotive GmbH, Malente (DE)

( * ) Notice: Subject to any disclaimer, the term of this patent is extended or adjusted under 35 U.S.C. 154(b) by 0 days.

(21) Appl. No.: 15/004,451

(22) Filed: Jan. 22, 2016

(65) Prior Publication Data

US 2016/0216716 A1    Jul. 28, 2016

(30) Foreign Application Priority Data

Jan. 27, 2015  (DE) .................... 20 2015 000 540 U

(51) Int. Cl.
| | | |
|---|---|---|
| *F16K 31/02* | (2006.01) | |
| *G05D 16/20* | (2006.01) | |
| *B60N 2/44* | (2006.01) | |
| *B60N 2/66* | (2006.01) | |
| *G01L 9/00* | (2006.01) | |

(52) U.S. Cl.
CPC ............. *G05D 16/20* (2013.01); *B60N 2/448* (2013.01); *B60N 2/4415* (2013.01); *B60N 2/665* (2015.04); *G01L 9/00* (2013.01); *G05D 16/2053* (2013.01)

(58) Field of Classification Search
CPC ...... G05D 16/20; G05D 16/2053; G01L 9/00; B60N 2/4415; B60N 2/665; B60N 2/448; H05K 1/0272

USPC .......................... 137/596.17, 596.14, 596.16
See application file for complete search history.

(56) References Cited

U.S. PATENT DOCUMENTS

| | | | | |
|---|---|---|---|---|
| 5,904,172 A | * | 5/1999 | Gifft ..................... | A47C 27/082 137/224 |
| 5,929,518 A | * | 7/1999 | Schlaiss ............... | G02B 6/4214 257/415 |
| 6,662,825 B2 | * | 12/2003 | Frank ...................... | B60T 8/362 137/557 |
| 7,484,528 B2 | * | 2/2009 | Beyerlein ............. | F16K 31/002 137/596 |
| 7,849,749 B2 | * | 12/2010 | Yamamoto ............ | G01L 9/0054 73/727 |

(Continued)

FOREIGN PATENT DOCUMENTS

| | | |
|---|---|---|
| CN | 101542135 A | 9/2009 |
| CN | 102138023 A | 7/2011 |

(Continued)

*Primary Examiner* — Minh Le
(74) *Attorney, Agent, or Firm* — Rankin, Hill & Clark LLP

(57) ABSTRACT

A pneumatic control and measuring device and seat comfort system with such a device. The pneumatic control and measuring device includes a valve and a pressure sensor, wherein the valve includes an input channel, a pressure channel, an output channel and a sealing element switched or switchable by an actuator. The sealing element is configured to connect the input channel with the pressure channel in that a supply pressure provided in the compressed air supply channel is or can be provided at an output connection of the valve fluidically communicating with the pressure channel. A pressure sensor for capturing a pressure present at the output connection is a printed-circuit-board-integrated pressure sensor.

17 Claims, 4 Drawing Sheets

(56) References Cited

U.S. PATENT DOCUMENTS

| | | | |
|---|---|---|---|
| 8,794,707 B2* | 8/2014 | Bocsanyi | B60N 2/4415 |
| | | | 297/284.6 |
| 8,809,975 B2* | 8/2014 | Niimura | G01L 9/00 |
| | | | 257/419 |
| 9,056,761 B2* | 6/2015 | Suganumata | B81B 7/007 |
| 9,080,581 B2* | 7/2015 | Bocsanyi | B60N 2/4415 |
| 9,097,365 B2* | 8/2015 | Larsen | F16K 99/0028 |
| 9,138,549 B2* | 9/2015 | Pagel | A61M 13/003 |
| 9,297,713 B2* | 3/2016 | Lo | H01L 23/481 |
| 9,468,307 B2* | 10/2016 | Lafleche | A47C 27/083 |
| 2002/0104369 A1 | 8/2002 | Baker et al. | |
| 2009/0194831 A1* | 8/2009 | Casey | G01L 19/148 |
| | | | 257/419 |
| 2009/0205724 A1 | 8/2009 | Brenner et al. | |
| 2011/0115140 A1 | 5/2011 | Moulik et al. | |
| 2014/0232155 A1* | 8/2014 | Bocsanyi | A47C 4/54 |
| | | | 297/284.6 |
| 2015/0210192 A1* | 7/2015 | Benson | B60N 2/505 |
| | | | 297/217.2 |
| 2016/0120035 A1* | 4/2016 | Brown | G01L 9/00 |
| | | | 73/753 |

FOREIGN PATENT DOCUMENTS

| | | |
|---|---|---|
| CN | 102874144 A | 1/2013 |
| DE | 10 2011 082 522 B3 | 11/2012 |

* cited by examiner

PNEUMATIC CONTROL AND MEASURING DEVICE AS WELL AS SEAT COMFORT SYSTEM

BACKGROUND OF INVENTION

Field of Invention

The invention relates to a pneumatic control and measuring device with a valve and with a pressure sensor, wherein the valve comprises an input channel, a pressure channel, an output channel and a sealing element switched or switchable by an actuator, and wherein the input channel is fluidically connected with a compressed air supply channel and the sealing element is configured to connect the input channel with the pressure channel in that a supply pressure provided in the compressed air supply channel is or can be provided at an output connection of the valve fluidically communicating with the pressure channel, wherein furthermore a pressure sensor for capturing a pressure present at the output connection is included, which is fluidically connected with the pressure channel or is integrated in the pressure channel.

Furthermore, the invention relates to a seat comfort system, comprising such a pneumatic control and measuring device.

Brief Description of Related Art

Dynamic seat comfort systems for car seats, for example, are generally known. They improve the comfort and tolerability above all during long trips. Both, static and dynamic comfort systems work with compressed-air-controlled pillows, which are integrated in the vehicle seats. The air pillows are actuated pneumatically and change the contour of the seat surface statically or dynamically.

Besides the appropriately equipped seat, another component of such a seat comfort system is a pneumatic control and measuring device. It is connected on the supply side to a compressed air supply line and is in the position to control in a pressure-regulated manner the individual pillows integrated in the seat. A pressure difference between the pressure prevailing inside the pillow, generally excess pressure, and the atmospheric or respectively ambient pressure is measured.

Known pneumatic control and measuring devices take a considerable amount of installation space and are also high-cost components of the seat comfort system. For example, connection adapters made of an elastomer material are used, which are placed on the output connection of a valve. On one hand, these connection adapters serve to connect the compressed air supply controlled via the valve with the expandable pillows of the seat, on the other hand, they also serve to receive a pressure sensor, which is a discrete electronic component.

BRIEF SUMMARY OF THE INVENTION

One object of the invention is to specify a pneumatic control and measuring device as well as a seat comfort system with a pneumatic control and measuring device, which is cost-effective, while the construction effort should be minimized at the same time.

The object is solved by a pneumatic control and measuring device with a valve and with a pressure sensor, wherein the valve comprises an input channel, a pressure channel, an output channel and a sealing element switched or switchable by an actuator, and wherein the input channel is fluidically connected with a compressed air supply channel and the sealing element is configured to connect the input channel with the pressure channel in that a supply pressure provided in the compressed air supply channel is or can be provided at an output connection of the valve fluidically communicating with the pressure channel, wherein furthermore a pressure sensor for capturing a pressure present at the output connection is included, which is fluidically connected with the pressure channel or is integrated in the pressure channel, characterized in that the pressure sensor is a printed-circuit-board-integrated pressure sensor.

The invention is based on the consideration that, through use of a printed-circuit-board-integrated pressure sensor, the pneumatic control and measuring device is simplified from a construction point of view and can thus be produced considerably more economically. The use of a discrete pressure sensor, which is no insignificant part contributing to the total cost of the system, is advantageously foregone. The effort to produce the control and measuring device simultaneously decreases because the printed circuit board does not need to be equipped with the discrete pressure sensor. This also entails a cost advantage.

According to an advantageous embodiment, the pneumatic control and measuring device is configured in that the valve comprises an input channel, a pressure channel, an output channel, a first sealing element switched or switchable by a first actuator and a second sealing element switched or switchable by a second actuator, and wherein the input channel is fluidically connected with a compressed air supply channel, the first sealing element is configured to connect the input channel with the pressure channel in that a supply pressure provided in the compressed air supply channel is or can be provided at an output connection of the valve fluidically communicating with the pressure channel and wherein the second sealing element is configured to connect the pressure channel with the output channel communicating with the atmosphere so that a pressure release is or can be effectuated in the pressure channel, wherein furthermore a pressure sensor for capturing a pressure present at the output connection is included, which is fluidically connected with the pressure channel or is integrated in the pressure channel, wherein the pneumatic control and measuring device is developed such that the pressure sensor is a printed-circuit-board-integrated pressure sensor.

A suitable printed-circuit-board-integrated pressure sensor is for example a capacitive pressure sensor. In particular, a capacitive pressure sensor is provided as known from DE 10 2011 082 522 B3 of Kuhnke Automotive GmbH & Co. KG. The disclosure of this document is hereby fully incorporated in the present description.

According to an advantageous embodiment, the pneumatic control and measuring device comprises a printed circuit board and the valve, electronic components and electrical connecting contacts of the control and measuring device are mounted on the printed circuit board, wherein the pressure sensor is integrated in the printed circuit board in a sensor area. A particularly compact pneumatic control and measuring device is advantageously provided by these measures.

According to a further embodiment, the pneumatic control and measuring device is designed in that an adapter made of an elastomer material is mounted on the output connection, wherein the adapter provides a further output connection and encloses an adapter volume, which communicates with the output connection of the valve, the further output connection of the adapter and with a top side of the printed circuit board in the sensor area, so that a pressure within the adapter volume is or can be determined with the integrated-circuit-board-integrated pressure sensor.

The pneumatic control and measuring device according to the named embodiment advantageously only requires minimal improving adjustments to an already known control and measuring device, namely the integration of the normally discretely designed pressure sensor into the printed circuit board. In other words, a printed circuit board, into which a pressure sensor is integrated in a sensor area, is used to manufacture such a pneumatic control and measuring device. It is thus possible to advantageously lower the overall cost of the system. This is in particular the case since the production step in which the discrete pressure sensor is mounted on the printed circuit board is omitted.

According to a further preferred embodiment, the valve comprises a valve body, wherein the input channel, the pressure channel and the output channel progress inside the valve body and the input channel and the output channel end on an outside of the valve body and the output connection is arranged on the outside of the valve body, wherein a measurement channel is present in the valve body, which feeds into the pressure channel on a first end and ends at an opposite-lying second end on the outside of the valve body.

Furthermore, the pneumatic control and measuring device is in particular designed in that the second end of the measurement channel ends on the bottom side of the valve body, which is part of the outside, wherein the valve is mounted on the printed circuit board such that the bottom side of the valve body lies opposite a top side of the printed circuit board in the sensor area.

Moreover, according to a further and advantageous enhancement, a pressure chamber is present between the bottom side of the valve body and the top side of the printed circuit board in the sensor area, which is sealed with respect to the atmosphere by a sealing element present between the top side of the printed circuit board and the bottom side of the valve body.

The omission of the adapter made of an elastomer material reduces the production costs of the pneumatic control and measuring device. Moreover, the required installation space is advantageously and considerably reduced. A more cost-efficient and at the same time smaller pneumatic control and measuring device is thus provided.

According to a further embodiment, the actuator is an electromagnetic actuator, in particular the first and/or the second actuator are electromagnetic actuators. For example, the pneumatic control and measuring device has suitable coils, which surround the valve body and drive anchor elements, which are configured to drive the corresponding switchable sealing elements such that the desired fluidic connection is established or interrupted.

A fluidic connection is in particular an air-tight connection or a compressed-air-tight or respectively compressed-air connection. The fluid, working fluid or fluidic medium is thus in particular air or respectively compressed air. This advantageously applies to all embodiments.

The object is further solved by a seat comfort system comprising a pneumatic control and measuring device according to one or more of the named aspects, wherein the seat comfort system further comprises a seat, in particular a car seat, with at least one integrated air pillow, wherein this air pillow is fluidically connected to the output connection of the pneumatic control and measuring device.

Same or similar advantages that were already mentioned with reference to the pneumatic control and measuring device also apply to the seat comfort system and will not be repeated in order to avoid repetitions.

Further characteristics of the invention will become apparent from the description of embodiments according to the invention together with the claims and the included drawings. Embodiments according to the invention can fulfill individual characteristics or a combination of several characteristics.

BRIEF DESCRIPTION OF THE DRAWINGS

The invention will be described below without restricting the general inventive idea using exemplary embodiments with reference to the drawings, and for any details according to the invention which are not explained further in the text express reference is made to the drawings.

The figures show in.

In the drawings, the same or similar elements and/or parts are provided with the same reference numbers in order to prevent the item from needing to be reintroduced.

DETAILED DESCRIPTION OF THE INVENTION

Figure 1:
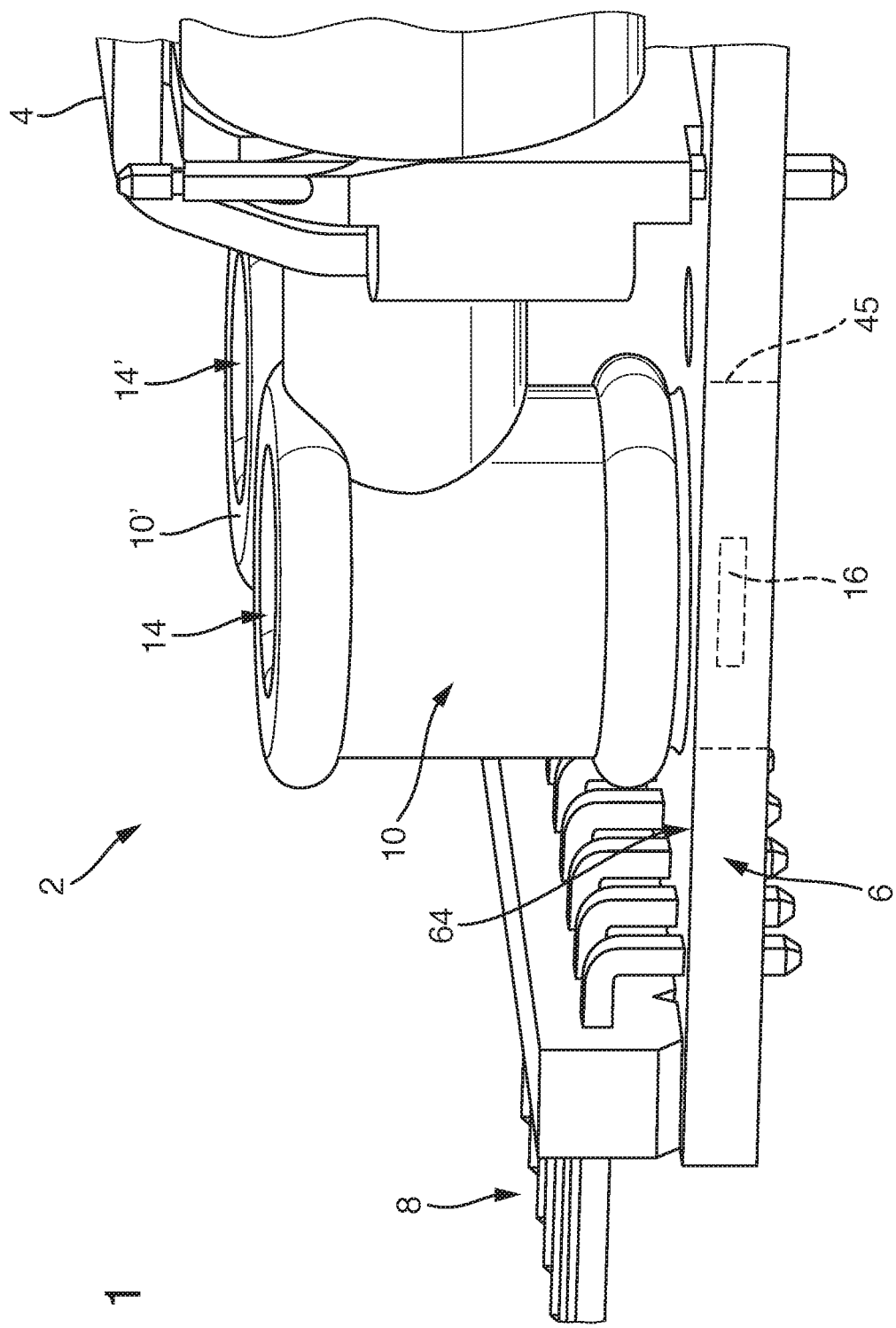
FIG. 1, a schematic perspective detailed view of a pneumatic control and measuring device.

FIG. 1 shows in a schematic perspective view a detail of a pneumatic control and measuring device 2. It comprises a valve 4, which is only shown in sections. Further details concerning the design of the valve 4 are named in connection with the description of FIGS. 2 to 4.

A 3/3-way valve 4 is referenced below as an example only. Different types of valves, for example 3/2-way valves, to which the following explanations apply analogously, are also provided as further exemplary embodiments (not shown).

The valve 4 is mounted on a printed circuit board 6, for example with the help of through connections. Furthermore, electronic components (not shown) of the pneumatic control and measuring device 2 as well as electrical connecting contacts 8 are mounted on the printed circuit board 6. The valve 4 comprises an output connection (not visible in FIG. 1), onto which an adapter 10 made of an elastomer material is mounted.

A further adapter 10' is visible in the background in the perspective representation in FIG. 1. It is mounted on the output connection of a further valve (also not visible), which is designed analogously to the valve 4. In other words, the pneumatic control and measuring device 2 thus comprises a plurality of valves 4.

The adapters 10, 10' provide further output connections 14, 14'. They are provided for example to receive plug connectors from compressed air lines which are connected with expandable air pillows of a seat comfort system. Such air pillows are preferably integrated in seats, in particular car seats, and together with the pneumatic control and measuring device 2 represent a seat comfort system. This offers for example dynamic comfort functionality, like lumbar support or a side bolster adjustment. Dynamic comfort functionality, like e.g. a massage system, may also be provided.

The adapter 10 encloses in its interior an adapter volume, which communicates on one hand with the output connection of the valve 4 and on the other hand with the further output connection 14 of the adapter 10. Furthermore, the adapter volume fluidically communicates with a top side 64 of the printed circuit board 6 and this in a sensor area 45.

The printed circuit board comprises in the sensor area 45 a printed-circuit-board-integrated pressure sensor 16. It is preferably a capacitive sensor. In particular, the printed circuit board 6 comprises a plurality of printed-circuit-board-integrated pressure sensors, in particular for each of the valves 4, which are arranged on the printed circuit board 6, a printed-circuit-board-integrated pressure sensor 16 respectively assigned to the valve 4. For the sake of clarity, only one pressure sensor 16 is indicated in FIG. 1.

The printed-circuit-board-integrated pressure sensor 16 is in particular designed as the capacitive pressure sensor known from DE 10 2011 082 522 B3. The disclosure of this document is hereby fully incorporated in the present description.

A pressure present within the adapter volume can be determined by help of the printed-circuit-board-integrated pressure sensor 16. Since the adapter volume directly communicates with the output connection 14, it is also possible with the pressure sensor 16 to determine the output pressure of the pneumatic control and measuring device 2. In a seat comfort system, a pressure balance in the system takes place within a short period of time. The output pressure thus corresponds with the pressure present in the air pillow of the system so that its value can be utilized for the pressure-controlled control of the seat comfort system.

In comparison to a pneumatic control and measuring device 2 in which discrete pressure sensors, mounted for example on a top side 64 of the printed circuit board 6, are used, the pneumatic control and measuring device 2 according the shown exemplary embodiment achieves a considerable cost advantage, since the pressure sensors 16 are already integrated in the printed circuit board 6.

Figure 2:
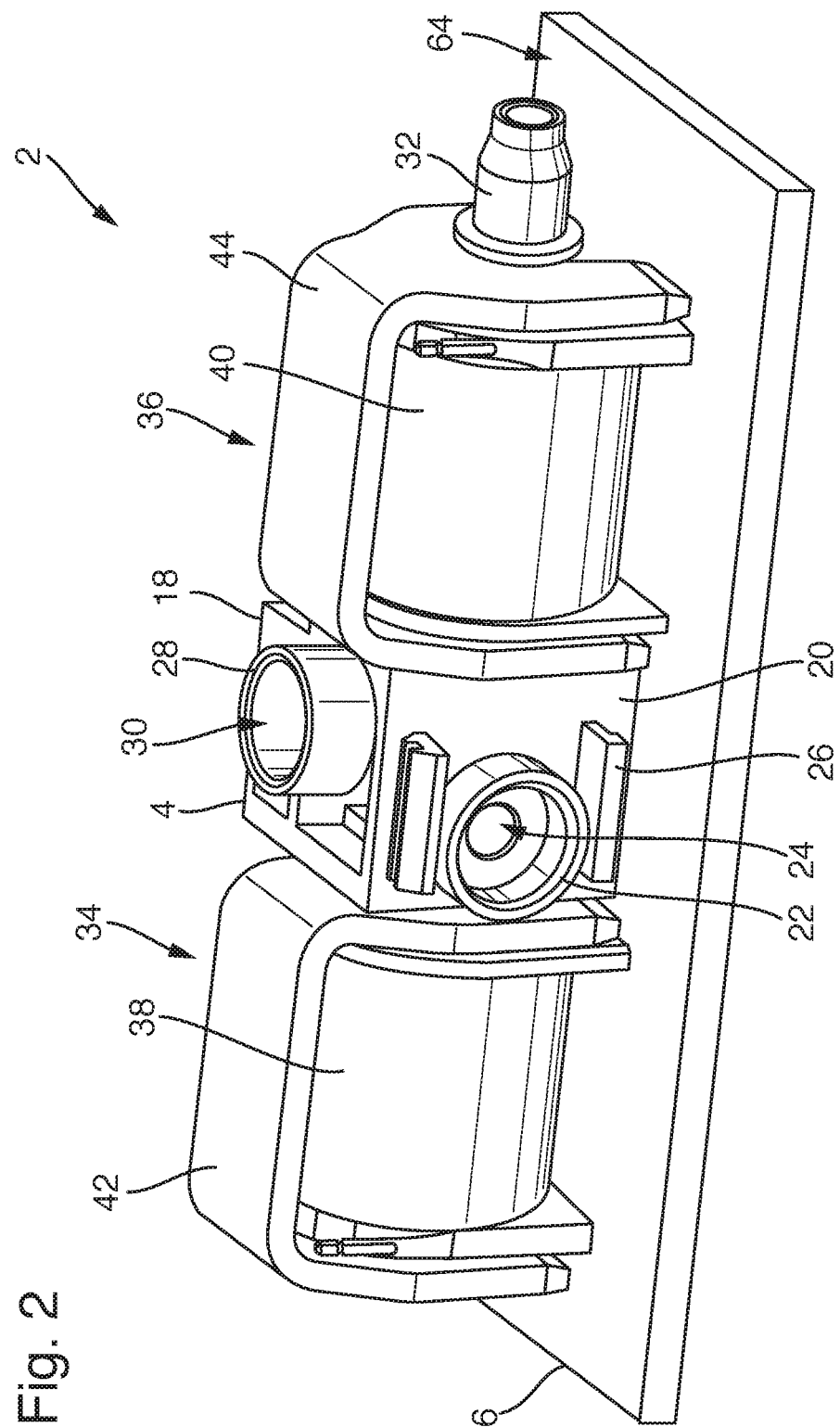
FIG. 2, a schematic perspective complete view of a pneumatic control and measuring device.

FIG. 2 shows a further pneumatic control and measuring device 2 in a schematic perspective view. It comprises a valve 4, which is mounted on a top side 64 of the printed circuit board 6.

A valve body 18 of the valve 14 has on its outside 20 an input connection 22, which connects an input channel 24 with a fluidic supply channel, in particular with a compressed air supply channel. For example, the valve 4 is designed such that a plurality of valves 4 of this type are arranged next to each other on the printed circuit board 6 and can be coupled with a common supply channel. The individual valves 4 are interconnected amongst each other at their respective opposite-lying sides of the valve body 18. Input connections 22 of neighboring valves 4 present on the outside 20 can be coupled to each other via locking connections. For this purpose, locking connection elements 26 are provided on the outside 20. An entire valve battery or a combined valve block can thus be supplied via a single supply line.

A working fluid, in particular compressed air, is supplied to the valve 4 via the input channel 24. From the individual valve 4, the working fluid at an output connection 32 is provided for example to an air pillow. The output connection 32 is thus connected in particular with an expandable air pillow of a seat comfort system via a compressed air line. The working fluid, i.e. in particular compressed air, exits the valve 4 via an output channel 30 which is present on the outside 20 of the valve body 18 and is surrounded by an exhaust air socket 28.

The output channel 30 communicates with the surrounding atmosphere. In other words, the working fluid is thus released into the environment. Thus, a pressure release is effectuated for example in an air pillow connected with the output connection 32.

For the switching of the valve 4, this comprises a first actuator 34 and a second actuator 36. According to the exemplary embodiment shown in FIG. 2, they are electromagnetic drives. These each comprise a magnetic coil, i.e. a first magnetic coil 38 or respectively a second magnetic coil 40. The first or respectively second actuator 34, 36 further comprises respectively an inboard movable anchor, which is configured to drive an inboard switchable sealing element. The magnetic flux in the electromagnetic drives is closed by an outer first or respectively second yoke 42, 44.

Furthermore, electronic components (not shown) as well as electrical connecting contacts (also not shown) of the control and measuring device 2 are mounted on the printed circuit board 6. Moreover, a pressure sensor 16 is integrated in the printed circuit board 6.

Figure 3:
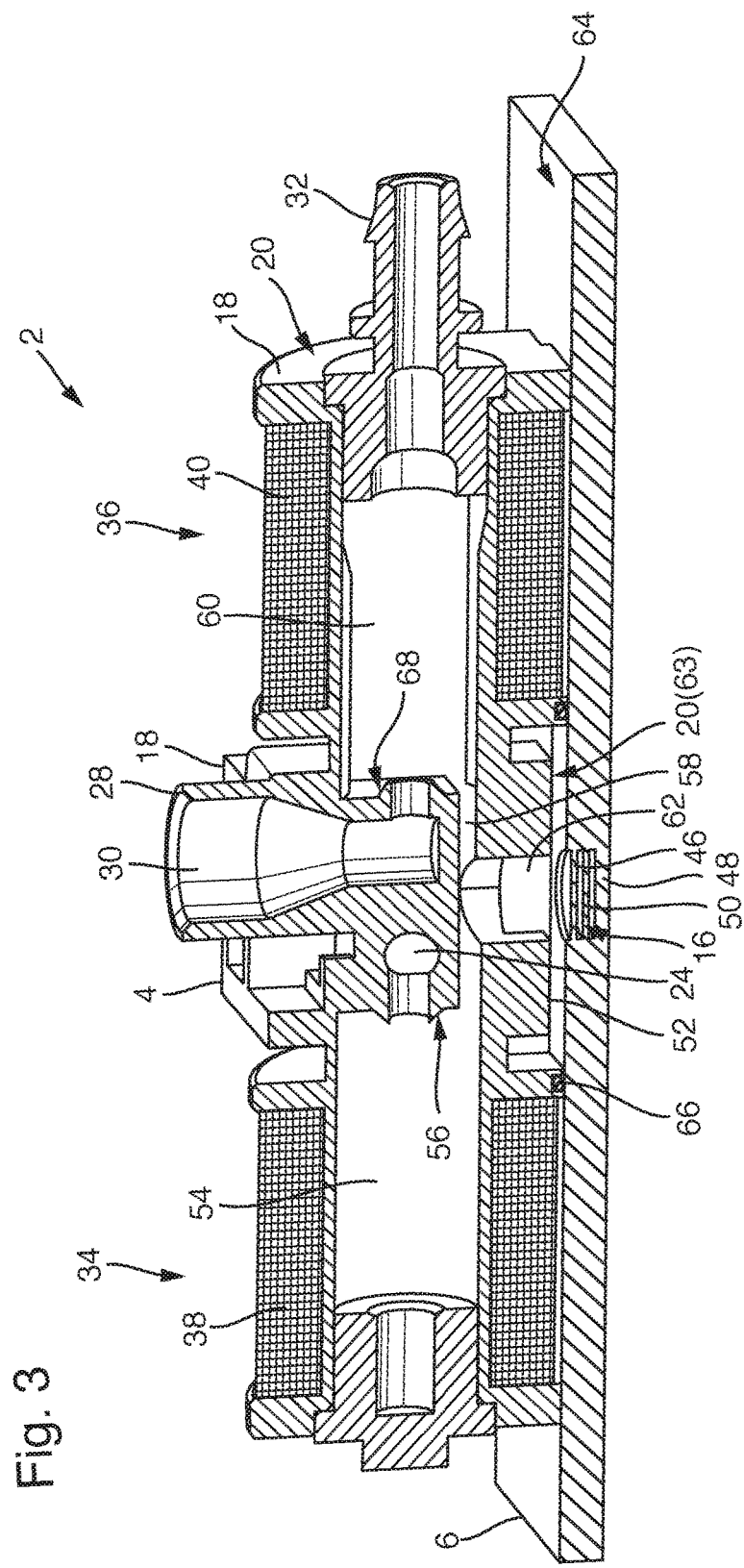
FIG. 3, a schematic perspective view of a pneumatic control and measuring device opened along a longitudinal cut.

FIG. 3 also shows the pneumatic control and measuring device 2 known from FIG. 2 in a schematic perspective view, wherein a cut along a perpendicular plane being oriented in the longitudinal axial direction of the valve 4 was performed. One half of the valve 4 facing the observer is not shown in order to allow a view into the inside of the valve 4 and of the printed circuit board 6.

The pressure sensor 16 integrated in the printed circuit board 6 is preferably a capacitive pressure sensor. It has a first base area body 46 facing the valve 4, a second base area body 48 present on the bottom side 63 of the printed circuit board 6 and a membrane body 50 lying between the first base area body 46 and the second base area body 48. The first base area body 46, the membrane body 50 and the second base area body 48 are separated from each other in a direction perpendicular to the area in which the printed circuit board 6 extends. A hollow space is designed on each of the two sides of the membrane body 50. A first hollow space is delimited by the first base area body 46 and the membrane body 50 in this perpendicular direction. The second hollow space is delimited by the membrane body 50 and the second base area body 48 in the perpendicular direction.

Furthermore, openings (not shown) are present in FIG. 3, which progress in this perpendicular direction through the first or respectively second base area body 46, 48. Thus, a first opening is present, which connects the hollow space between the first base area body 46 and the membrane body 50 with a pressure chamber 52 lying above it. A second opening or respectively bore hole, which connects the hollow space between the membrane body 50 and the second base area body 48 with a bottom side 63 of the printed circuit board 6 and thus with the surrounding atmosphere, extends through the second base area body 48.

In other words, the pressure present in the pressure chamber 52 is thus present in the first hollow space between the first base area body 46 and the membrane body 50. In contrast, ambient or atmospheric pressure is present in the second hollow space between the membrane body 50 and the second base area body 48. As a result of the pressure difference be-tween these two pressures which are present in the first and second hollow space, the membrane body 50 deforms either in the direction of the valve 4 or away from it.

The areas of the first and second base area body 46, 48 delimiting the hollow space as well as the areas of the membrane body 50 delimiting the first or respectively second hollow space are metalized or respectively have a metallic coating. Two capacitors are thus formed, the capacities of which change depending on the pressure difference between the two chambers. It is thus possible by comparing the two capacities to measure a differential pressure between the pressures present in the first and the second chamber.

The first and the second base area body 46, 48 as well as the membrane body 50 are preferably manufactured based on a non-conductive printed circuit board substrate. For example, such a printed circuit board substrate is designed based on paper, fiber glass cloth or fiber glass mats or a resin matrix.

Furthermore, the printed-circuit-board-integrated pressure sensor 16 is designed according to the disclosure of DE 10 2011 082 522 B3. The disclosure of this document is fully incorporated in the present description.

Figure 4:
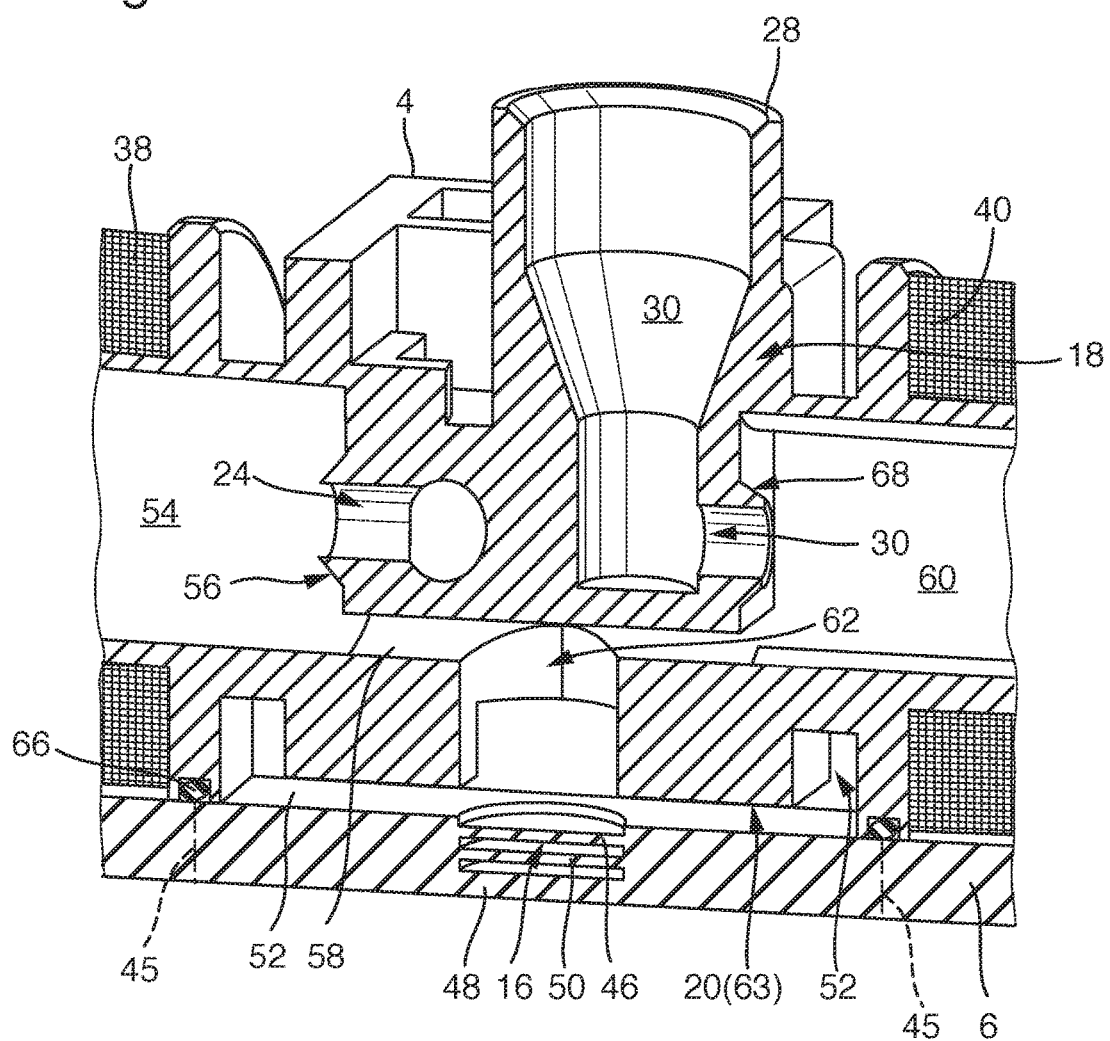
FIG. 4, a detailed view of the representation known from FIG. 3.

FIG. 4 shows a detailed view of the perspective representation of the valve 4 known from FIG. 3. The functionality of the valve 4 is explained below based on FIGS. 3 and 4.

A supply pressure provided via the input channel 24 arrives in a first chamber 54 provided that a switchable sealing element, which is located on a first seal seat 56 and is not shown for the sake of clarity, opens the path from the input channel 24 into the first chamber 54. This first sealing element is actuated by the first magnetic coil 38, which serves as the first actuator 34. The fluidic medium, in particular compressed air, arrives from the first chamber 54 via an overflow channel 58 in a second chamber 60 and is made available at the output connection 32. For example, a compressed air hose, which leads to an expandable pillow of a seat comfort system, is connected with the output connection 32. As soon as the first sealing element on the first seal seat 56 closes the first chamber 54 off from the input channel 24 and thus the supply pressure, the same pressure is set in the first chamber 54, the second chamber 60, the overflow channel 58 and the system connected to the output connection 32 a pressure balance takes place.

Starting from the overflow channel 58, a measurement channel 62 is present, which connects the pressure chamber 52 with the overflow channel 58. It is thus possible to measure the pressure, which is present in the overflow change 58 of the first and the second chamber 54, 60 as well as the pressure chamber 52, with the printed-circuit-board-integrated pressure sensor 16. Together with the overflow channel 58, the first and second chamber 54, 60 form a pressure channel of the valve 4.

This pressure channel progresses inside the valve body 18 and ends at the output connection 32 present on an outside of the valve body 18. The measurement channel 62 also progresses inside the valve body 18; it ends at a first end in this pressure channel and at an opposite-lying second end on an outside 20 of the valve body 18. In other words, the pressure chamber 52 lies on the outside 20, or more precisely on the bottom side 63, of the valve body 18. The pressure chamber 52 is sealed with respect to a top side 64 of the printed circuit board 6 with the help of a circumferential seal 66. The seal 66 is located directly on the top side 64 of the printed circuit board 6.

A second sealing element, which works together with the second seal seat 68 and is not shown for the sake of clarity, is opened to release the pressure. This second sealing element is switched by the second magnetic coil 40, which serves as the second actuator 36. The output channel 30 is connected with the second chamber 60 so that a pressure release is effectuated in the system via the output channel 30. The output channel ends in the ambient atmosphere so that the compressed air previously present in the system is released into the environment.

All named characteristics, including those taken from the drawings alone and also individual characteristics which are disclosed in combination with other characteristics are considered alone and in combination as essential for the invention. Embodiments according to the invention can be realized by individual characteristics or a combination of several characteristics. In the context of the invention, characteristics which are designated with "in particular" or "preferably" are understood to be optional characteristics.

LIST OF REFERENCE CHARACTERS IN DRAWING FIGURES

The following reference characters appear in the drawings:
2 Pneumatic control and measuring device
4 Valve
6 Printed circuit board
8 Electrical connecting contact
10, 10' Adapter
14, 14' Additional output connection
16 Printed-circuit-board-integrated pressure sensor
18 Valve body
20 Outside
22 Input connection
24 Input channel
26 Locking connection elements
28 Exhaust air socket
30 Output channel
32 Output connection
34 First actuator
36 Second actuator
38 First magnetic coil
40 Second magnetic coil
42 First yoke
44 Second yoke
45 Sensor area
46 First base area body
48 Second base area body
50 Membrane body
52 Pressure chamber
54 First chamber
56 First seal seat
58 Overflow channel
60 Second chamber
62 Measurement channel
63 Bottom side
64 Top side
66 Seal
68 Second seal seat

What is claimed is:

1. A pneumatic control and measuring device comprising:
a valve; and
a pressure sensor;
wherein the valve comprises an input channel, a pressure channel, an output channel and a sealing element switched or switchable by an actuator,
wherein the input channel is fluidically connected with a compressed air supply channel and the sealing element is configured to connect the input channel with the pressure channel such that a supply pressure provided in the compressed air supply channel is or can be provided at an output connection of the valve fluidically communicating with the pressure channel,
wherein the pressure sensor is integrated in the pressure channel and configured to capture a pressure present at the output connection, and wherein the pressure sensor is integrated in a printed circuit board between a top side and a bottom side of the printed circuit board in a sensor area as a printed-circuit-board-integrated pressure sensor.

2. The pneumatic control and measuring device according to claim 1, wherein the valve, electronic components and electrical connecting contacts of the control and measuring device are mounted on the printed circuit board.

3. The pneumatic control and measuring device according to claim 2, wherein an adapter made of an elastomer material is mounted on the output connection, wherein the adapter provides a further output connection and encloses an adapter volume, which communicates with the output connection of the valve, the further output connection of the adapter and with the top side of the printed circuit board in the sensor area such that a pressure within the adapter volume is or can be determined with the printed-circuit-board-integrated pressure sensor.

4. The pneumatic control and measuring device according to claim 1, wherein the valve comprises a valve body, wherein the input channel, the pressure channel and the output channel progress inside the valve body and the input channel and the output channel end on an outside of the valve body, and the output connection is arranged on the outside of the valve body, and wherein a measurement channel is present in the valve body, which feeds into the pressure channel on a first end and ends at an opposite-lying second end on the outside of the valve body.

5. The pneumatic control and measuring device according to claim 4, wherein the second end of the measurement channel ends on a bottom side of the valve body, which is part of the outside, wherein the valve is mounted on the printed circuit board such that the bottom side of the valve body lies opposite the top side of the printed circuit board in the sensor area.

6. The pneumatic control and measuring device according to claim 5, wherein a pressure chamber is present between the bottom side of the valve body and the top side of the printed circuit board in the sensor area, which is sealed with respect to the atmosphere by a sealing element present between the top side of the printed circuit board and the bottom side of the valve body.

7. The pneumatic control and measuring device according to claim 1, wherein the actuator is an electromagnetic actuator.

8. A seat comfort system comprising a pneumatic control and measuring device according to claim 1 and a seat.

9. The seat comfort system according to claim 8 wherein the seat is a car seat with at least one integrated air pillow, which is fluidically connected to the output connection.

10. A pneumatic control and measuring device comprising:
a valve; and
a pressure sensor;
wherein the valve comprises an input channel, a pressure channel, an output channel a first sealing element switched or switchable by a first actuator and a second sealing element switched or switchable by a second actuator,
wherein the input channel is fluidically connected with a compressed air supply channel,
wherein the first sealing element is configured to connect the input channel with the pressure channel such that a supply pressure provided in the compressed air supply channel is or can be provided at an output connection of the valve fluidically communicating with the pressure channel
wherein the second sealing element is set up to connect the pressure channel with the output channel communicating with the atmosphere so that a pressure release is or can be effectuated in the pressure channel,
wherein the pressure sensor is integrated in the pressure channel and configured to capture a pressure present at the output connection, and
wherein the pressure sensor is integrated in a printed circuit board between a top side and a bottom side of the printed circuit board in a sensor area as a printed-circuit-board-integrated pressure sensor.

11. The pneumatic control and measuring device according to claim 10, wherein the valve, electronic components and electrical connecting contacts of the control and measuring device are mounted on the printed circuit board.

12. The pneumatic control and measuring device according to claim 11, wherein an adapter made of an elastomer material is mounted on the output connection, wherein the adapter provides a further output connection and encloses an adapter volume, which communicates with the output connection of the valve, the further output connection of the adapter and with the top side of the printed circuit board in the sensor area such that a pressure within the adapter volume is or can be determined with the printed-circuit-board-integrated pressure sensor.

13. The pneumatic control and measuring device according to claim 10, wherein the valve comprises a valve body, wherein the input channel, the pressure channel and the output channel progress inside the valve body and the input channel and the output channel end on an outside of the valve body, and the output connection is arranged on the outside of the valve body, and wherein a measurement channel is present in the valve body, which feeds into the pressure channel on a first end and ends at an opposite-lying second end on the outside of the valve body.

14. The pneumatic control and measuring device according to claim 13, wherein the second end of the measurement channel ends on a bottom side of the valve body, which is part of the outside, wherein the valve is mounted on the printed circuit board such that the bottom side of the valve body lies opposite the top side of the printed circuit board in the sensor area.

15. The pneumatic control and measuring device according to claim 14, wherein a pressure chamber is present between the bottom side of the valve body and the top side of the printed circuit board in the sensor area, which is sealed with respect to the atmosphere by a sealing element present between the top side of the printed circuit board and the bottom side of the valve body.

16. The pneumatic control and measuring device according to claim 10, wherein at least one of the first actuator and the second actuator is an electromagnetic actuator.

17. The pneumatic control and measuring device according to claim 10, wherein the first actuator and the second actuator are both electromagnetic actuators.

* * * * *